United States Patent [19]

Hearn et al.

[11] Patent Number: 4,664,641

[45] Date of Patent: May 12, 1987

[54] BOX TYPE TURKEY CALL WITH ECCENTRICALLY MOUNTED ACTUATOR

[76] Inventors: Larry J. Hearn, Rte. 2, Box 217, Medon, Tenn. 38356; Parker Whedon, 11322 Carmel Chace Dr., Charlotte, N.C. 28226

[21] Appl. No.: 780,845

[22] Filed: Sep. 27, 1985

[51] Int. Cl.$^4$ .................... A63H 5/00; G05G 1/00
[52] U.S. Cl. .................... 446/397; 74/571 M
[58] Field of Search ............ 446/397; 74/522, 571 M; 16/386, 241, 381

[56] References Cited

U.S. PATENT DOCUMENTS

| | | | |
|---|---|---|---|
| 276,292 | 4/1883 | Seymour | 74/571 M |
| 574,534 | 1/1897 | Gibson | 446/397 |
| 1,336,174 | 4/1920 | Way | 16/242 |
| 2,533,502 | 12/1950 | Philips | 16/381 X |
| 2,606,401 | 8/1952 | Boatwright | 446/397 |
| 2,995,339 | 8/1961 | Persiaux | 74/522 |
| 3,793,767 | 2/1974 | Pulley | 446/397 |
| 4,235,567 | 11/1980 | Pilch | 74/522 X |
| 4,343,108 | 8/1982 | Lee | 446/397 |
| 4,475,266 | 10/1984 | Suska | 16/381 |

FOREIGN PATENT DOCUMENTS 326204  2/1930  United Kingdom ................. 16/241

Primary Examiner—Robert A. Hafer
Assistant Examiner—D. Neal Muir
Attorney, Agent, or Firm—Clifton Ted Hunt

[57] ABSTRACT

This box type turkey call features a laterally moved actuator contacting the sides of a box. The actuator is mounted on a rotatable mounting. Attachment is eccentric on the mount. The mount, on the opposite surface, is slotted to accept a tool to affect movement of the attachment as the mount is rotated. This movement of the point of attachment enables this box call to produce a variety of different calls, each of which may be finely tuned, and to compensate for wear.

6 Claims, 8 Drawing Figures

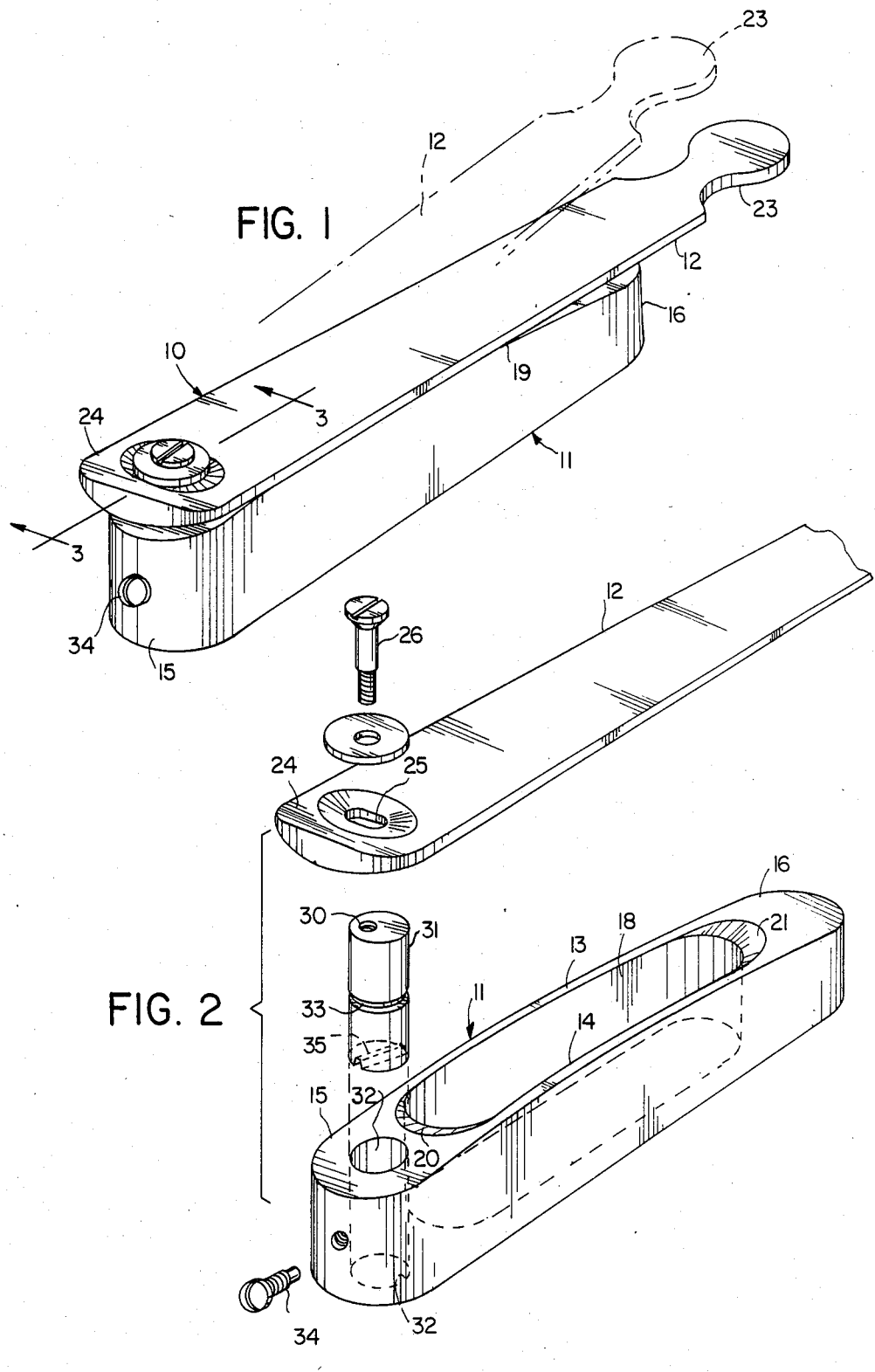

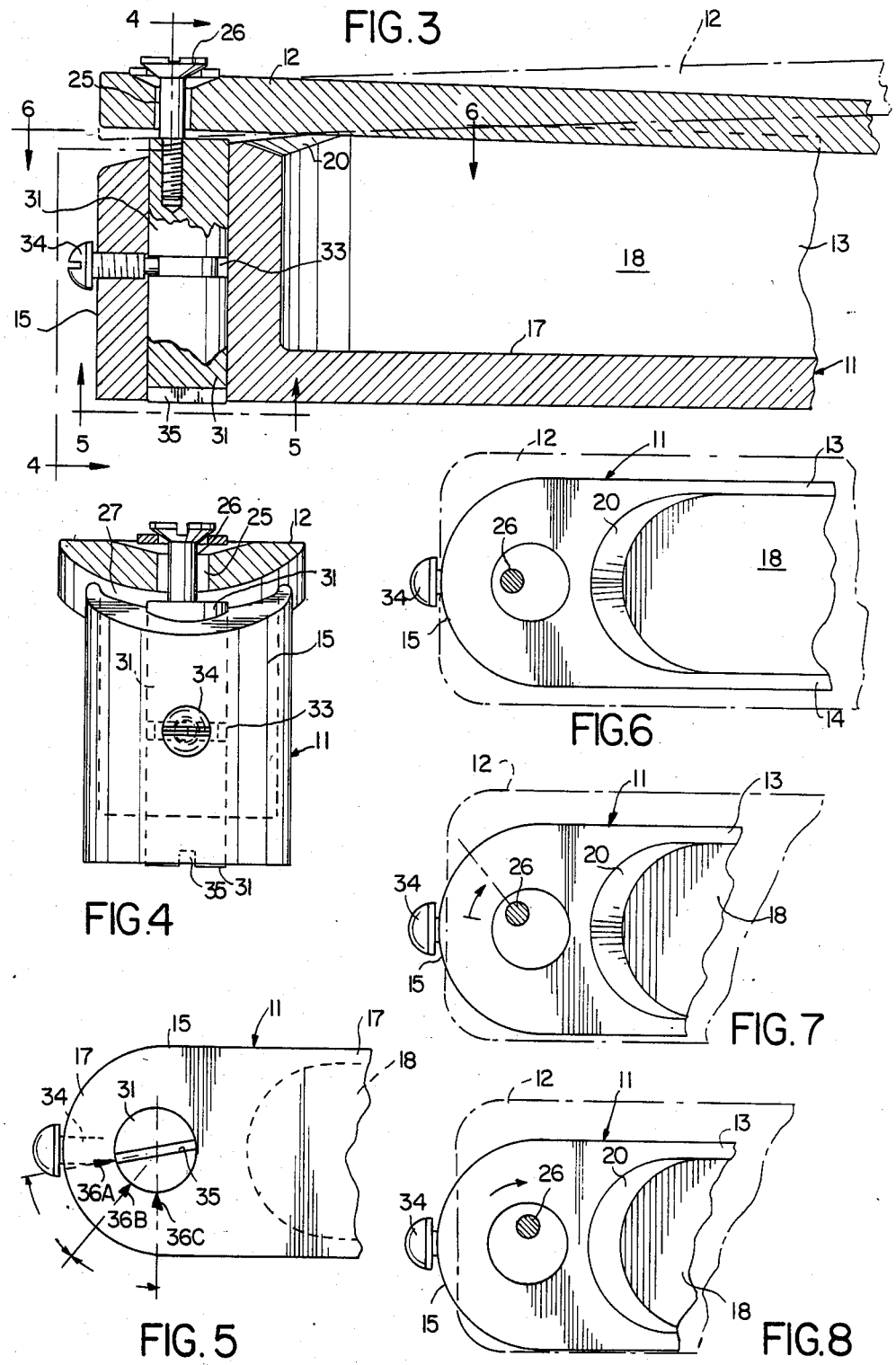

BOX TYPE TURKEY CALL WITH ECCENTRICALLY MOUNTED ACTUATOR

BACKGROUND OF THE INVENTION

This invention relates to a turkey call and more specifically to the type of turkey call known as a box call. The box call produces sound by striking or rubbing a chalk-covered wooden lid or actuator against the sides of the box. The box is held in one hand and the actuator is held in the other hand and manipulated against at least one of the upper edges of the side walls. Box type turkey calls are manufactured of wood and take the form of an upwardly open elongated wooden box having arcuate edges on laterally spaced side walls joined by a bottom wall. A wooden actuator or lid covers the top of the box and is conventionally pivotally fastened to the front end of the box for lateral reciprocation against the upper edges of the side walls. The actuator has a rounded lower surface which is conventionally coated with chalk or resin and a sound is emitted by drawing the chalk-covered rounded lower surface of the actuator across the arcuate upper edges of the side walls. A box type turkey call of the type described is disclosed in U.S. Pat. No. 574,534 issued Jan. 5, 1897 to H. C. Gibson.

It is known in the prior art to modify the Gibson structure to enable the emission of different sounds to simulate different types of turkey calls. U.S. Pat. No. 3,100,948 issued Aug. 20, 1963 to Edward J. Tax discloses a box type turkey call including an actuator 16 with a slate bar 28 extending transversely of the actuator arm and movable along the length of the actuator arm so the slate engages the side walls of the box at different places for obtaining variations in the sound produced by moving the slate against the box.

U.S. Pat. No. 3,793,767 issued Feb. 26, 1974 to John L. Pulley discloses a box type turkey call including a damper 33 movable about a pivot point 32 to bear against the sounding board 20 adjacent the base 19 to produce a higher sound, and selectively movable away fron the base 19 and toward the upper end of the board 20 to produce a lower sound.

U.S. Pat. No. 4,343,108 issued Aug. 10, 1982 to Ben R. Lee for a box type turkey call and discloses an actuator pivotally connected to the box by a screw selectively penetrating one of a group of laterally spaced bores in the actuator registrable with correspondingly laterally spaced threaded bores in the box. Variations in the tone or pitch of the sound is effected by the lateral adjustment of the actuator relative to the box.

SUMMARY OF THE INVENTION

The present invention utilizes a box type turkey call with the conventional box and actuator, but the actuator is longitudinally and laterally adjustable relative to the box to produce different sounds. Specifically, the actuator is eccentrically mounted to the box in such a way that rotation of the eccentric mounting relocates the actuator along the length of the box and thereby causes the actuator to rub against different portions of the upper edges of the side walls to produce a different tonal quality of sound. The structure and operation are simpler than any known prior art, and the result is an infinite variety of tones and pitches of sound whereby the many sounds of turkey may be closely imitated.

BRIEF DESCRIPTION OF THE DRAWINGS

FIG. 1 is a perspective view looking at the top and one side of the box type turkey call and showing the actuator in solid lines aligned with the box and in phantom lines pivoted laterally of the box;

FIG. 2 is an exploded perspective view, with parts broken away, illustrating the assembly of the eccentrically mounted actuator;

FIG. 3 is a sectional view taken substantially along the line 3—3 in FIG. 1;

FIG. 4 is a sectional view taken substantially along the line 4—4 in FIG. 3;

FIG. 5 is an inverted plan view of the front end of the box looking at substantially the area indicated by the line 5—5 in FIG. 3;

FIG. 6 is a plan view looking at substantially the area indicated by the line 6—6 in FIG. 3 and showing the actuator in phantom lines; and FIGS. 7 and 8 are plan views similar to FIG. 6 but illustrating the relocation of the actuator longitudinally of the bos as the eccentric mounting of the actuator is rotated in a clockwise direction.

DETAILED DESCRIPTION OF THE INVENTION

Referring more specifically to the drawings, a box type turkey call is broadly indicated at 10. The box type turkey call 10 comprises a sound box 11 and an actuator 12. The sound box 11 may be formed from a single block of wood, as illustrated, or may be formed from separate pieces of wood appropriately joined to define side walls 13, 14 and end walls 15, 16 joined by a bottom wall 17. The walls 13–17 define an open topped cavity 18 in the sound box 11. The thick end walls 15 and 16 each taper inwardly as at 20 and 21 respectively toward the cavity 18 in box 11. The side walls 13 and 14 are relatively thin and their upper edges slope outwardly and downwardly from a point 19 at the middle portion of the box 11 in FIG. 1.

The actuator 12 is preferably slightly wider than the box 11 and overhangs the side walls 13 and 14. The actuator 12 is longer than the box 11 and includes a handle 23 extending beyond the rear wall 16. The front end 24 of the actuator 12 is penetrated by a laterally elongated slot 25 loosely penetrated by a threaded bolt 26 pivotally connecting the actuator 12 to the sound box 11. The under surface 27 of the actuator 12 is rounded laterally (FIG. 4) and lateral reciprocation of the actuator 12 between the in-line solid line position of FIG. 1 and the laterally reciprocable phantom line position of FIG. 1 causes the rounded lower surface 27 of actuator 12 to rub against the thin side walls 13 and 14 of the sound box 11 emitting sounds in imitation of turkeys.

The box type call 10 as thus far described is conventional, and it is with a structure of this type that the present invention is intended for use.

According to the invention, the threaded bolt 27 is eccentrically mounted as at 30 in a bushing 31 snugly received for rotational movement in a vertical bore 32 in front wall 15 of the sound box 11. The bushing 31 has an annular groove 33 extending about its mid portion and seated in the annular groove 33 is the inner end of a bolt 34 penetrating the front wall 15 and limiting vertical movement of the bushing 31 relative to the sound box 11. The bushing 31 also has a slot 35 extending diagonally across its lower end. The threaded bolt 34 may be moved into locking engagement with the bushing 31 to prevent movement of the bushing relative to the box.

The slot 35 receives a suitable tool, such as a screwdriver or coin (not shown), to rotate the bushing 31 relative to the box 11 and correspondingly adjust the position of the actuator 12 longitudinally and laterally relative to the box 11. The slot 35 functions as an indicator to be selectively aligned with indicia such as indicated at 36A, 36B and 36C on the bottom 17 of box 11 to designate predetermined positions of the actuator 12 relative to the sound box 11. The indicia 36A, 36B, and 36C are exemplary only, and in actual practice there may be twelve or more markings arranged in a circle around the axis of the bushing. The indicator 35 and the indicia arranged around the axis of the bushing function as a dial, whereby the hunter may dial the tone he wants to produce by rotating the slot 35 into alignment with selected indicia which, in the same operation, moves the actuator to a predetermined location relative to the box to produce a predetermined sound.

FIGS. 6, 7 and 8 illustrate that the actuator 12 is closer to the front and left (or lower side of the box as seen in FIG. 8) when the slot 35 in bushing 31 is aligned with indicia 36A to position the eccentric mounting connection 30 toward the front of the box (FIG. 6) than it is when the slot 35 is moved to alignment with indicia 36C, whereby the actuator 12 is moved rearwardly and to the right, and away from the front and left side of the box (FIG. 8). Movement of slot 35 in alignment with indicia 36B causes movement of actuator 12 to a point between 36A and 36C. It is repeated that the indicia 36A, 36B, and 36C are illustrative only, and that any desired amount of indicia may be used to indicate a like number of predetermined locations of the actuator along the top of the box to produce a like number of sounds.

When the actuator 12 is in the foremost position of FIG. 6, the actuator contacts the edges of the sidewalls at and forwardly of the point 19 to produce a high pitched sound. When the actuator is in the rearmost position of FIG. 8, the actuator rubs against the sidewalls rearwardly of point 19 to produce a deeper sound. The actuator may be infinitely adjusted along the length and breadth of the box to produce desired sounds by simply rotating the bushing 31.

As best seen in FIG. 4, the lower surface 27 of actuator 12 is rounded from side to side and the box tapers rearwardly and forwardly from point 19 (FIG. 1) to increase the potential number of working surfaces. Relocation of the lid or actuator by turning the dial slot 35 presents new striking surfaces on both the lid and sides of the box at each increment of the indicia.

There is thus provided an improved game call wherein a desired sound may be repeatedly and reliably obtained by simply turning the dial slot 35 to move the lid or actuator to a predetermined location relative to the box to locate prescribed working surfaces on box and lid in opposition to each other to produce the desired sound when rubbed together.

Although specific terms have been employed in describing the invention, they are used in a descriptive and generic sense only and not for purpose of limitation.

We claim:

1. In a game call having a box with a bottom wall, side walls, end walls and a lid having a lower surface which is rounded from side to side and overlying the sidewalls of the box with a handle extending beyond one end of the box, the combination of a bushing mounted in the endwall opposite the handle, means pivotally connecting the lid to the bushing in offset relation to the axis of the bushing, and means for rotating the bushing, whereby the lid is selectively repositioned on the box to produce a predetermined sound.

2. A structure according to claim 1 including visible indicia positioned about the axis of the bushing, and an indicator on the bushing, whereby the bushing may be rotated to position the indicator opposite a selected increment of indicia and correspondingly move the lid to a predetermined position relative to the box.

3. A structure according to claim 2 including means for selectively preventing rotation of the bushing relative to the box.

4. A structure according to claim 2 wherein said indicator is a dial slot.

5. A structure according to claim 4 wherein the indicia is formed on the lower surface of said one end wall.

6. A game call comprising an open-top box having a bottom wall, sidewalls and endwalls, a bushing extending through the longitudinal axis of the box and between the top and bottom surfaces of one endwall, said bushing having an offset opening extending parallel with the axis of the bushing and communicating with the top of said one endwall, a lid overlying the sidewalls of the box and including a handle extending beyond the end wall of the box opposite said one end wall, said lid having an opening therethrough communicating with said one end wall of the box, a bolt extending through the opening in the lid and engaged in the offset opening in the bushing, whereby the bushing may be rotated on its axis to reposition the lid relative to the sidewalls of the box.

* * * * *